Nov. 22, 1949  J. O. DENTON, JR  2,488,855
SWEETENING AND DESULFURIZING HYDROCARBONS
Filed June 20, 1947
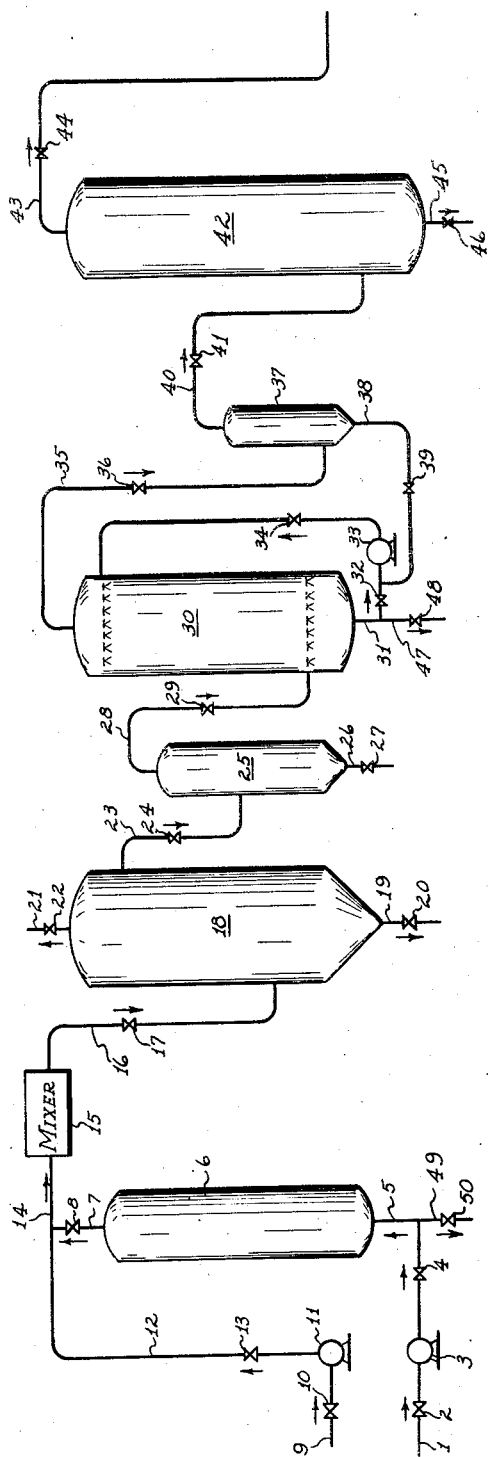
INVENTOR.
JOSEPH O. DENTON, JR.
BY Benedict & Swartwood
ATTORNEYS Patented Nov. 22, 1949

2,488,855

UNITED STATES PATENT OFFICE 2,488,855

SWEETENING AND DESULFURIZING HYDROCARBONS

Joseph O. Denton, Jr., Lubbock, Tex.

Application June 20, 1947, Serial No. 755,985

6 Claims. (Cl. 196—29)

This invention relates to a process for sweetening and desulphurizing distillates such as those obtained by the straight run distillation or cracking of petroleum oils and similar charging stocks.

Freshly prepared hydrocarbon oils often contain sulphur compounds which are undesirable, particularly in motor fuels, because of the bad odor and corrosive character they impart to the product, as well as because the susceptibility of motor fuels to improvements in octane rating upon the addition of tetraethyl lead is less in the presence of these sulphur compounds than in their absence.

Various methods have been resorted to for improving the odor, lead susceptibility and other properties of such gasolines and distillates. Among the treating agents which have been used is sodium hypochlorite.

The present invention relates to an improved process employing sodium hypochlorite and certain active naturally occurring clays. The process involves particularly the manipulative and procedural steps for treating distillates of the character described to improve lead susceptibility, color, odor and sulphur content.

In one specific embodiment the invention comprises passing untreated distillates such as gasoline, from which hydrogen sulphide has been removed substantially completely, through a stationary bed of an adsorbent, mixing the filtered distillate with a treating agent comprising an alkali metal hypochlorite, subjecting the mixture to efficient and rapid agitation, passing the mixture to a separating zone, and removing the spent treating solution substantially completely, passing the gasoline to a settling tower to further separate any entrained treating solution, contacting the gasoline with an aqueous solution of an alkali metal hydroxide, and thereafter passing it through a stationary bed of an adsorbent.

The figure illustrates one embodiment in which a petroleum distillate such as gasoline is treated according to the present invention.

Referring to the drawing, a distillate such as gasoline is introduced through line 1, valve 2, pump 3, valve 4, line 5 into the bottom of a tower 6 containing an adsorbent such as fuller's earth, and out through line 7 and valve 8. The temperature is in the range of about 50–100° F. Upward flow is preferred. An alkali metal hypochlorite solution is introduced through line 9, valve 10, pump 11, line 12 and valve 13, mixing with the oil from line 7 in line 14. The mixture of gasoline and hypochlorite solution passes into a mixer 15 wherein it is intimately and rapidly contacted at about 50–100° F. This mixer may be of the mechanical type or an orifice mixer or other suitable mixing device wherein the distillate and treating solution may be thoroughly mixed. It is preferably located so that the mixture will flow by gravity through line 16 and valve 17 into separator 18 which may be a cone-bottomed vessel having a draw-off line 19 containing valve 20 from which the spent treating solution is withdrawn and may be discarded. The separating vessel 18 has a vent line 21 and valve 22. The distillate which separates from the major portion of the spent treating solution passes through line 23 containing valve 24 to a settling tower 25 from which any remaining entrained treating solution is separated and withdrawn through line 26 containing valve 27. The clarified distillate passes overhead from the settling tower 25 through line 28 and valve 29 to a caustic scrubbing tower 30. This tower contains a solution of alkali metal hydroxide such as sodium hydroxide of 10–30% concentration and at 50–100° F. The sodium hydroxide may be continuously withdrawn through line 31, valve 32 and pump 33, valve 34 and introduced into the top of the treating tower 30 to flow downwardly, preferably in the form of fine droplets, through the gasoline. The scrubbed gasoline passes overhead through line 35 containing valve 36 into a second settling tower or trap 37. The caustic solution which may be entrained in the gasoline separates out and passes through line 38 containing valve 39 joining with line 31 and being recirculated through pump 33. The gasoline, which is substantially free of caustic solution, passes through line 40 containing valve 41, being introduced near the bottom of the clay tower 42 from which it passes upwardly and out through line 43 and valve 44 to storage. The treating tower 42 may be drained through line 45 and valve 46. Spent caustic solution may be removed from tower 30 through line 47 and valve 48. The primary adsorbent tower 6 may be drained through line 49 and valve 50.

The hypochlorite solution employed in this process is alkaline in character, containing an excess of from about 2 to about 4% sodium hydroxide and containing approximately 1% chlorine in the form of sodium hypochlorite. This latter may vary from about 0.5 to about 3%, but in any event an excess of sodium hydroxide should be used.

The proportion of treating agent to distillate treated will vary depending upon the sulphur content of the distillate. In general it is chosen so that only a small amount of unreacted hypochlorite remains in the spent treating solution. It is an advantage of the present process that this can be done, thereby eliminating the need for recirculating the substantially spent solution.

The sodium hydroxide solution used in tank 30 comprises 10–30% and preferably about 15–25% sodium hydroxide. Potassium or lithium hydroxide may also be employed. The adsorbent employed in towers 6 and 42 may comprise a natural untreated clay of about 12 to 20 mesh, having adsorbent activity. These may include natural clays found in various localities including deposits in Texas and throughout the mid-continent area. Fuller's earth may also be employed. It is preferred that these clays have some adsorbent properties as well as serving as a filter medium. Various synthetic adsorbent materials such as silica gel may also be used.

It has been found that this procedure permits a saving of hypochlorite solution. If the initial treatment with the clay in tower 6 is omitted, approximately twice as much hypochlorite solution is required as when this step is added. The additional steps of separation, caustic treatment and final treatment with fuller's earth completely sweeten the oil which is then ready for use. Inhibitors may be added to the cracked distillates.

The treating operation is carried out at atmospheric temperature generally in the range of about 50–90° F. using a contact time in mixer 15 of about 40 to 45 seconds.

*Example 1.*—When using a straight run gasoline of about 57° A. P. I. gravity, having a 250° F. average boiling point and a 390° F. end point, the sulphur content is reduced about 40%. The original untreated gasoline after removal of hydrogen sulphide had a sulphur content of 0.27% and a mercaptan sulphur content of 0.064%. When using 0.9 lb. of chlorine in the form of sodium hypochlorite, and 1.4 lbs. of sodium hydroxide per barrel of gasoline, the distillate was completely sweet and the sulphur content was reduced to about 0.15%. The octane number with 3 cc. of tetraethyl lead per gallon was 2.5 points higher than that of the same gasoline caustic washed and doctor sweetened. It was nearly one point higher than the same gasoline treated without clay treatment in tower 6.

*Example 2.*—In another run employing straight run gas oil having a gravity of 36° A. P. I., 500° F. average boiling point and 710° F. end point and 1.3% sulphur, approximately 1 lb. per barrel of chlorine employed as sodium hypochlorite sweetened the distillate and reduced the sulphur content by about 30%.

*Example 3.*—A cracked gasoline of 390° F. end point contained 0.55% sulphur and 0.04% mercaptan sulphur. Sweetening with 0.4 lb. per barrel of chlorine as sodium hypochlorite and 0.65 lb. of sodium hydroxide per barrel reduced the sulphur content by 30 to 40% and produced a doctor sweet product. The lead susceptibility improved in the same manner as that of the gasoline in Example 1.

*Example 4.*—A 550° F. end point, 36° A. P. I. gravity cracked gas oil was sweetened with about 0.5 lb. per barrel of chlorine as sodium hypochlorite with a reduction of approximately 40% in sulphur content.

The clay used in the tower can be used repeatedly by back washing occasionally with naphtha.

The hydrogen sulphide may be removed from the original distillate either by a stabilizing treatment after the cracking or distilling step, in which light ends are stabilized from the distillate, or can be removed by a preliminary treatment with alkali such as sodium hydroxide, sodium carbonate, etc. When the stabilized distillate is used it is preferred to include a light caustic wash in order to be certain that no hydrogen sulphide passes into the sweetening and desulphurizing step. Under the conditions of treatment, if hydrogen sulphide is contacted with hypochlorite solution it is converted to free sulphur which is detrimental to the final product.

The finished gasoline has a materially improved color and sweet odor as well as a substantially improved anti-knock property such as susceptibility to tetraethyl lead, and blending value when blended with other hydrocarbon fractions.

It is another advantage that the process requires but two pumps, one for distillate and a smaller one for treating solution. The pressures employed are only sufficiently above atmospheric to pass the distillate through the plant.

I claim as my invention:

1. A process for refining hydrocarbon distillates which comprises passing a hydrogen sulphide-free hydrocarbon distillate through a bed of adsorbent clay, then mixing it with an aqueous solution of an alkali metal hypochlorite in sufficient quantity to react with the mercaptan sulphur and at least 30–40% of the total sulphur content of the distillate, separating and removing spent treating solution, removing entrained spent treating solution from the gasoline, then passing the clear distillate into contact with an aqueous solution of alkali metal hydroxide, separating and clarifying the distillate, and then passing it through a bed of adsorbent clay to final storage.

2. A process for refining hydrocarbon distillates which comprises passing a hydrogen sulphide-free hydrocarbon distillate through a bed of an adsorbent earth, mixing the distillate under conditions of rapid and intimate mixing with a sufficient quantity of alkaline sodium hypochlorite solution to react with 30–40% of the sulphur contained therein, removing the spent treating solution substantially completely, washing the distillate with a strong solution of alkali metal hydroxide and passing the thus washed gasoline through an adsorbent clay.

3. The process of claim 2 wherein the distillate is straight run gasoline.

4. The process of claim 2 wherein the distillate is cracked gasoline.

5. The process of claim 2 wherein the distillate comprises a high boiling distillate oil.

6. A process for refining hydrocarbon distillates which comprises passing a hydrogen sulphide-free petroleum distillate through a stationary bed of adsorbent earth at about 50–100° F., intimately mixing the distillate at about the same temperature with an alkaline aqueous solution of alkali metal hypochlorite for not over about 45 seconds, completely separating the spent solution from the distillate, intimately mixing the distillate at 50–100° F. with aqueous alkali metal hydroxide of 10–30% concentration, completely separating the caustic solution, and passing the clear distillate through a bed of adsorbent earth at about 50–100° F., and recovering the sweet, desulphurized distillate.

JOSEPH O. DENTON, Jr.

REFERENCES CITED

The following references are of record in the file of this patent:

UNITED STATES PATENTS

| Number | Name | Date |
|---|---|---|
| 1,435,824 | Dunstan | Nov. 14, 1922 |
| 1,552,830 | Dunstan | Sept. 8, 1925 |
| 1,570,193 | Acheson | Jan. 19, 1926 |